Figure 1:
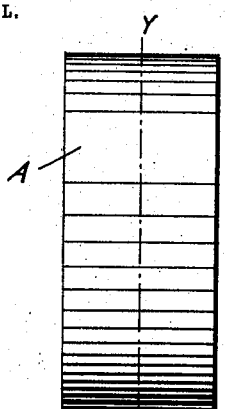

No. 760,564. PATENTED MAY 24, 1904.
N. RHOADES, Jr.
CONCRETE SLEEVE PIPE COUPLING.
APPLICATION FILED NOV. 17, 1903.
NO MODEL. 2 SHEETS—SHEET 1.

WITNESSES: INVENTOR.

No. 760,564. PATENTED MAY 24, 1904.
N. RHOADES, Jr.
CONCRETE SLEEVE PIPE COUPLING.
APPLICATION FILED NOV. 17, 1903.
NO MODEL. 2 SHEETS—SHEET 2.

WITNESSES: INVENTOR.

No. 760,564. Patented May 24, 1904.

UNITED STATES PATENT OFFICE.

NELSON RHOADES, JR., OF LITTLETON, COLORADO.

CONCRETE-SLEEVE PIPE-COUPLING.

SPECIFICATION forming part of Letters Patent No. 760,564, dated May 24, 1904.

Application filed November 17, 1903. Serial No. 181,515. (No model.)

*To all whom it may concern:*

Be it known that I, NELSON RHOADES, Jr., a citizen of the United States, residing at Littleton, Arapahoe county, State of Colorado, (whose post-office is 404 and 408 Tabor Building, Denver, Colorado,) have invented a new and useful Improvement in Concrete-Sleeve Pipe-Couplings; and I do hereby declare the following to be a full, clear, and exact description thereof.

My invention relates to the couplings used for connecting the ends of clay, earthen, or vitrified tubing, whereby such tubing may be connected in a manner making it serviceable for the carrying of water or other liquids under great pressure without leakage or danger of breakage. Heretofore such pipes have been made with an enlargement or bell on one end, into which the small end of a succeeding section of pipe was inserted and calked into place by packing the space between the pipe and the bell end with concrete or other similar substance. This method of constructing, owing to the difference in contraction and expansion of the pipe and bell, they being of different diameter and volume, results in a great many fire-cracks during the application of great heat in the processes of vitrification. These fire-cracks occur at the point of junction between the pipe proper and the bell and greatly weaken the pipe, not only at the point of union between sections, but also for some distance back into the pipe from the bell. Thus while the pipe itself away from the end has strength capable of resisting the pressure due to great heads this weakness renders it impracticable for use under appreciable heads. The result of placing it under head is to force out the packing, cause it to break at the weak point, or, since the packing consists of concrete forced between two vitrified surfaces to which it does not closely adhere, for the reason that neither will take up the surplus moisture originally entering with the concrete, such concrete remains porous and leakage through it results. These objections render it impracticable to employ these classes of pipe so constructed in any water-supply system where great resistance to pressure or protection against leakage is requisite.

The object of my invention is to overcome the above objections by providing a sleeve-coupling for pipes of this class, and thus obviate the necessity of constructing a bell end on the pipe; to make it possible to construct pipe of equal diameter and thickness at all points and of constant strength throughout; to construct the coupling of such a class that when in place and connected to the pipe the packing used will adhere to the coupling and cannot be pushed out by pressure from within, a water-tight union of the pipes resulting, the point of union being of strength equal to that of the pipe itself and greatly adding to the stability of the constructed lines; to construct a coupling such that when liquid concrete is employed as a filling between the pipe and the coupling and pressure is applied to such packing the water contained in it will flush to the surface next the vitrified pipe and finding no means of escape through this vitrified surface discharge its surplus backward through the packing to the concrete coupling, which absorbs it slowly as the pressure is applied and all spaces made vacent by loss of water are filled with concrete, with the result that the surface against the vitrified pipe becomes glazed and impervious to the passage of water through it; to construct a coupling which will be equally durable and indestructible as the pipe and will not materially add to the cost of the former types; to construct such a coupling as when used with these pipes will adapt them to use in systems where great pressure will be applied.

With these ends in view my invention consists of a molded concrete sleeve the outside diameter of which is uniform at every point for any given size of pipe, but the inner diameter of which is least at the middle, at which point its diameter is such as to permit the pipe which it couples to enter easily. From this middle point where the ends of the pipe-sections meet toward the ends of the sleeve the inner diameter of the sleeve increases to allow room for packing to be used in effecting the connection until within a short distance of the end of the sleeve, when the inner diameter of the sleeve is reduced to prevent the packing when hardened from being pushed out by the pressure from within. To give great strength to the sleeve, a cylinder of expanded metal or some class of woven or welded wire of diameter less than the outer diameter of the sleeve, being entirely surrounded and covered by concrete, is inserted.

To enable others not skilled in the art to make and use my invention and to show how the above objects are accomplished by this concrete-sleeve pipe-coupling, I will describe the same more fully, referring for that purpose to the accompanying drawings, in which—

Figure 3:
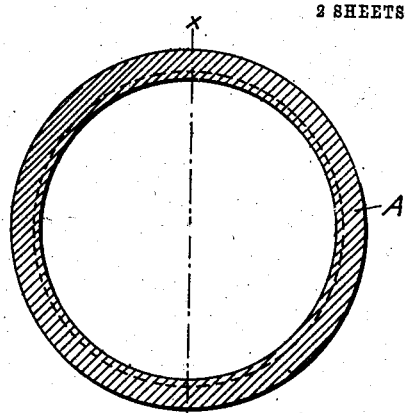
Figure 4:
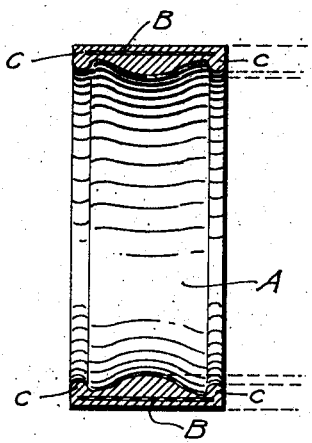
Figure 2:
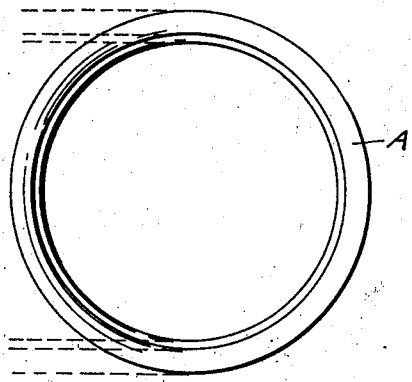
Figure 5:
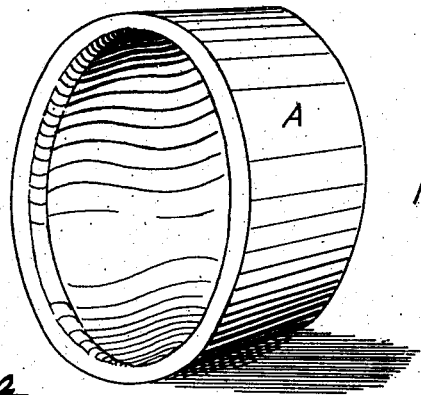
Figure 6:
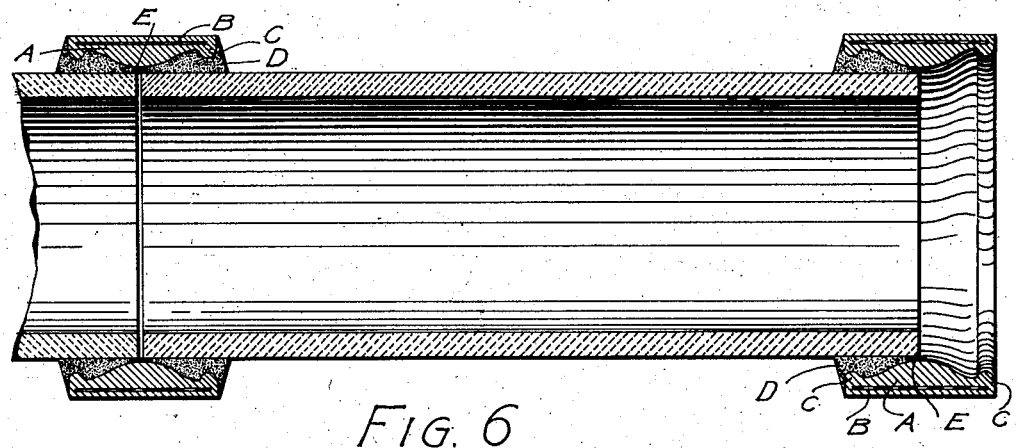
Figure 7:
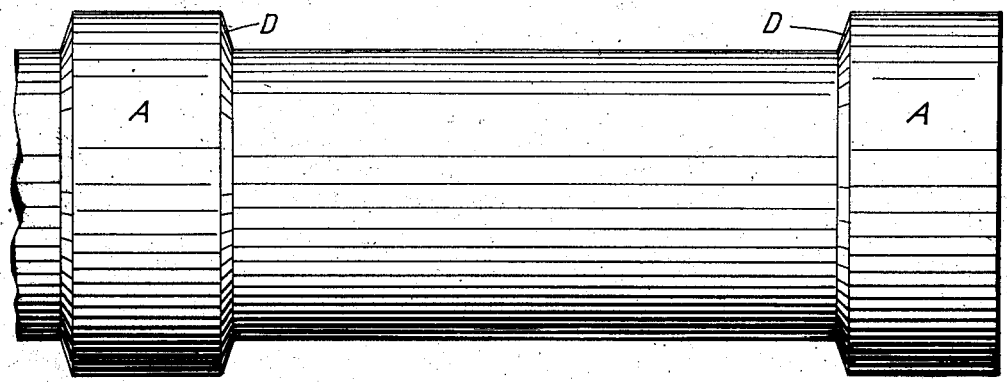
Figure 8:
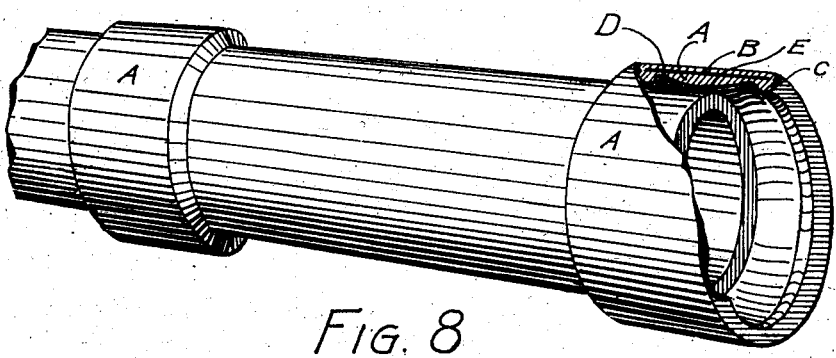

Figure 1 is an elevation of the sleeve. Fig. 2 is a plan of the sleeve. Fig. 3 is a cross-section on line Y Y. Fig. 4 is a longitudinal cross-section of the sleeve. Fig. 5 is a perspective of the sleeve. Fig. 6 is a longitudinal cross-section of two sleeves in place attached to pipe. Fig. 7 is a longitudinal elevation of two sleeves in place attached to pipe. Fig. 8 is a perspective of two sleeves in place attached to pipe.

Similar letters refer to similar parts throughout the several views.

That part of the drawings lettered A is a sleeve constructed from cement concrete under great pressure, the shortest inner diameter being slightly greater than the greatest diameter of the pipe with which it is used. The sleeve is made by pouring liquid concrete into a mold and subjecting it to great pressure, after which the mold is removed and the sleeve permitted to dry.

That part of the drawings lettered B is a metal core constructed within and covered by the material of which the sleeve is composed and consisting of expanded or perforated metal of any variety or spirally-formed wire, welded, or woven wire.

That part of the drawings lettered C is the choke-ring of the sleeve, which prevents the calking of the sleeve-joint from being forced outward when acted upon by pressure from within.

That part of the drawings lettered D is the calking material used for closing the space between the pipe and the sleeve and consists when introduced of liquid concrete, and it is introduced into the joint by gravity-pressure and by the application of mechanical pressure reduced in volume and moisture to a condition of natural repose in the form shown in Fig. 6.

That part of the drawings lettered E is a cord of jute packing used to center the joints within the sleeve.

I am not aware that prior to my invention molded concrete sleeves with metal cores have been invented or used with clay, earthen, or vitrified pipe.

What I claim as my invention, and desire to secure by Letters Patent, is—

As an article of manufacture a sleeve for connecting the ends of pipes, said sleeve being composed of concrete and having embedded therein an annular reinforcing-strip of open-work metal, the central and end portions of said sleeve being of a reduced internal diameter and forming between them annular recesses for the reception of packing, substantially as described.

NELSON RHOADES, Jr.

Witnesses:
   WILLIAM C. STERNE,
   HARRY NUTTING.